United States Patent Office 2,760,843
Patented Aug. 28, 1956

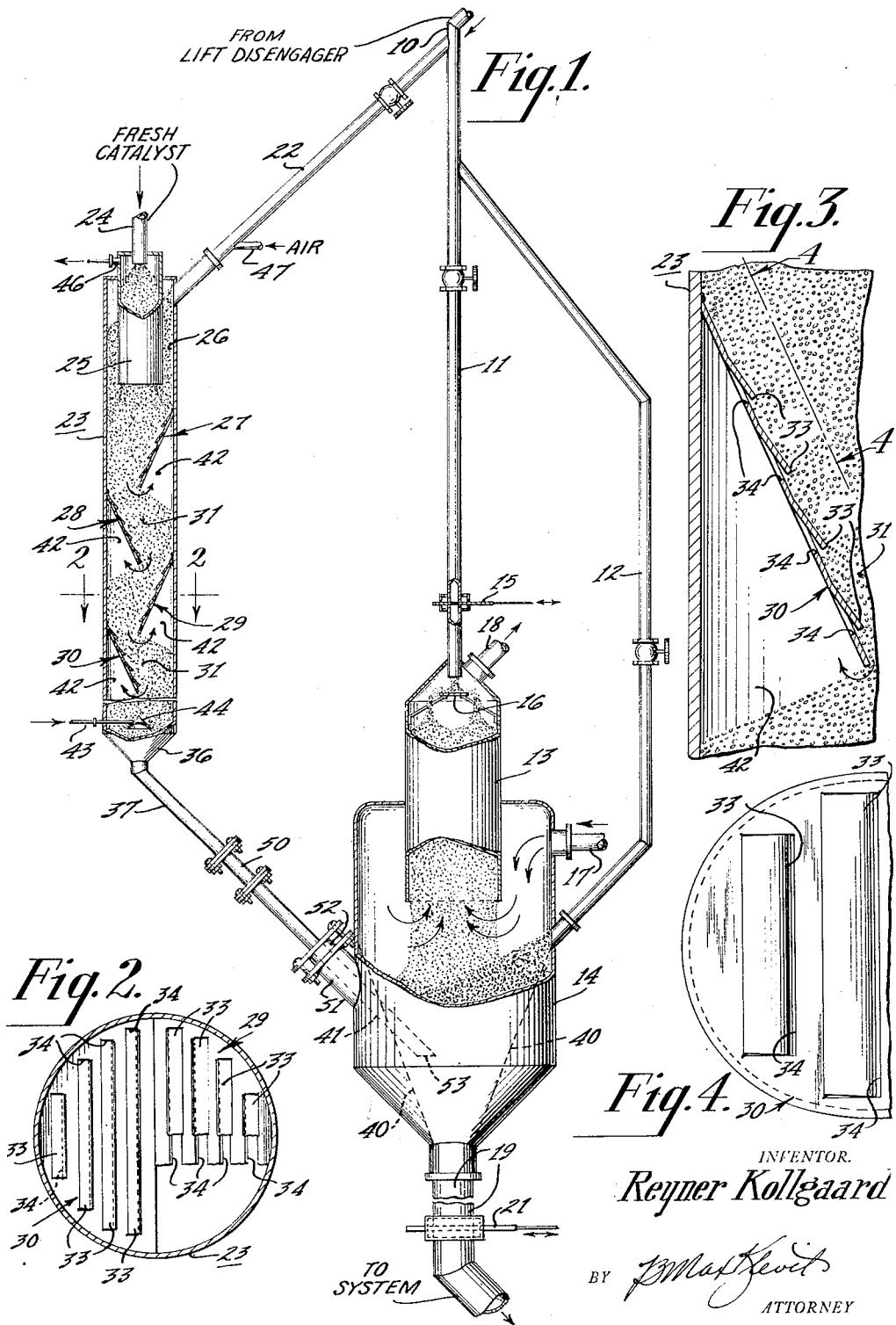

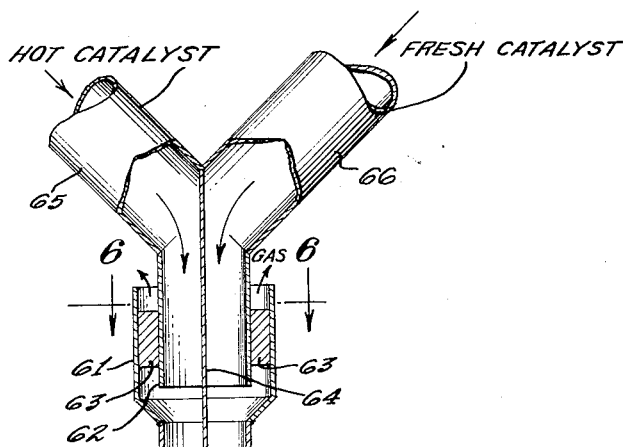
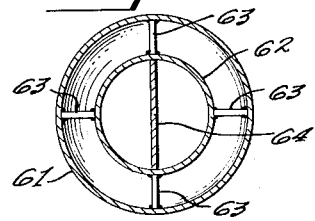
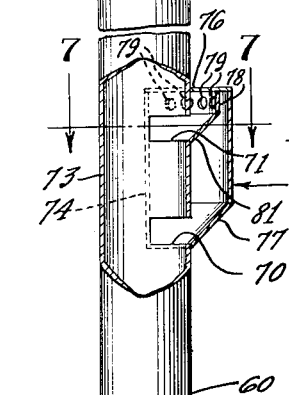
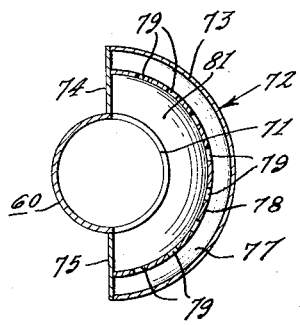
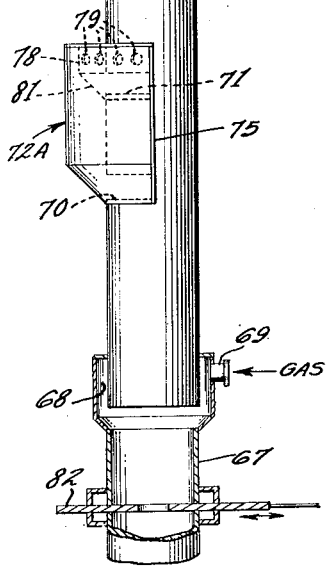

2,760,843

CATALYST ADDITION PROCESS AND APPARATUS

Reyner Kollgaard, San Mateo, Calif., assignor to Houdry Process Corporation, Wilmington, Del., a corporation of Delaware Application October 6, 1952, Serial No. 313,305

10 Claims. (Cl. 23—1)

The present invention relates to systems for circulating hot granular solids, such as catalyst, through a fluid contacting zone, and is particularly concerned with improved arrangements for supplying fresh solids to such systems.

In a typical system to which the invention applies granular catalyst is circulated through a reaction zone wherein it is contacted with hydrocarbons to be converted and then through a regeneration zone or kiln wherein carbonaceous deposit is removed from the catalyst by combustion, thereby reheating the catalyst to required temperature at which it is returned to the reaction zone. In such systems, as a result of repeated circulation a portion of the granular catalyst is reduced by attrition and breakage to fines and particles of less than desired size range; these undersized particles in the circulating system are removed therefrom and replaced by fresh catalyst of required size. Also as a result of repeated use in conversion and regeneration the average activity level of the catalyst in the system gradually declines; therefore, in order to maintain a desired minimum activity level, a portion of the catalyst is replaced by fresh make-up catalyst of higher activity.

In order to prevent possible breakage due to thermal shock and/or the formation of regions of comparatively lower temperature by the periodic addition of cooler make-up catalyst to the system, various arrangements have been previously resorted to or suggested for preheating the fresh catalyst before it is admitted to the circulating body of catalyst.

Circulating solids systems of the type described are generally provided with an elutriation arrangement whereby a minor portion of the catalyst from the circulating body thereof is withdrawn at a suitable elevated location and is passed through an elutriator wherein it is contacted by a flowing stream of gas effective in selectively suspending fines and undersized particles and removing the same, while the coarser granules are returned to the system at some convenient location. In such arrangements it has been proposed to add the relatively cool make-up catalyst to the returning portion of the hot granules from the elutriator, thereby effecting some admixing and heat exchange therebetween.

By the arrangement of the present invention pre-heating of the fresh make-up catalyst is conveniently and readily effected by transfer of heat from a portion of the hot catalyst by-passed from the principal circulating body thereof, and under conditions such that the rate and extent of heat transfer is rapid and efficient. This is accomplished, in accordance with the present invention in part by direct heat exchange contact between hot and cold catalyst and in part by indirect heat exchange through the medium of a positively flowing stream of gas passing in serial contact between hot and cold particles.

The invention may be practiced in several different types of apparatus. In one preferred embodiment the desired heat exchange between the hot regenerated catalyst and the cooler fresh make-up catalyst is effected by passing these materials together downwardly through an elongated heat exchange and mixing vessel while flowing a gas upwardly through that vessel to assist heat transfer from the hot to the cooler catalyst granules. Baffles are provided within the vessel obtaining some degree of mixing of the particles and inducing cross-flow of gas within the vessel favoring heat transfer. In a second preferred embodiment the heat exchange is effected in a conduit operating as a specially designed seal leg through which the catalyst passes downwardly as a column composed of adjacent contacting strata of hot and cooler catalyst respectively. The column is provided with means inducing cross-flow of gas therein whereby sensible heat is picked up from the stratum of hot catalyst and transferred to the adjacent stratum of cooler catalyst so that the total catalyst reaches or approaches an equilibrium temperature.

The operation of the invention and the advantages thereof will be appreciated from the detailed description of the several embodiments thereof which follow, read in connection with the accompanying drawings, wherein:

Figure 1 is a view in vertical elevation, parts being broken away and shown in section, of one form of arrangement for mixing and preheating make-up catalyst in accordance with the invention;

Figure 2 is an enlarged cross section taken on the line 2—2 of Figure 1;

Figure 3 is an enlarged fragmentary view in elevation showing a portion of Figure 1 in greater detail;

Figure 4 is a top plan view of a baffle member shown in Figure 3, viewed in direction indicated by line 4—4 in Figure 3;

Figure 5 is a vertical elevation of a modified form of heat exchange arrangement, parts being broken away and shown in section;

Figure 6 is an enlarged cross section taken on the line 6—6 of Figure 5; and

Figure 7 is an enlarged cross section taken on line 7—7 of Figure 5.

Referring now more particularly to Figure 1, there is shown a conduit 10 through which a minor portion of the catalyst circulating for instance in a hydrocarbon conversion system (not shown in the drawings) is withdrawn for elutriation in known manner. Thus, in connection with a system employing a gas lift discharging into a disengager hopper for circulation of the catalyst, the conduit 10 would receive its supply of catalyst from the bottom of such disengager or from some other suitable elevated level in the system. In typical systems the catalyst supplied to conduit 10 will be in hot freshly regenerated condition. Conduit 10 is provided with a branch line 11 feeding to the top of an elutriator 13 and a second branch line feeding to a compact bed of catalyst maintained in a hopper 14 forming the lower part of the elutriator. The quantity of catalyst entering the top of the elutriator is controlled by an orifice plate 15 in line 11, or by a suitable valve or other flow control device in that line. The catalyst drops freely in line 11 below the control device 15 and discharges onto a plate 16, dropping over the periphery of the plate as a freely falling stream of particles, which particles are traversed in section 13 by a counter-currently flowing stream of elutriating gas admitted into the bottom of that section from a supply line 17. The gas stream passing upwardly through the elutriator section 13 picks up dust and undersized finely divided particles, which are carried by suspension in the gas and discharged therewith through a gas outlet line 18 at the top of the elutriator. Line 18 may be connected to a cyclone or other solids separator (not shown). The coarser particles discharge from the upper elutriator section 13 onto the bed maintained in the enlarged hopper portion 14. The level of the bed in hopper 14 is maintained substantially constant by branch line 12 irrespective of the amount of catalyst supplied to the bed via line 11 and section 13. The catalyst is discharged from the bottom of the elutriator through a conduit 19 at a rate controlled by an orifice plate 21 or other suitable device for controlling solids flow. Through conduit 19 or an extension thereof, the discharged catalyst of desired size is returned to any suitable location in the principal solids circulating system. In systems employing a gas lift, the catalyst from line 19 may be supplied, for example, to the lift inlet.

The elutriation system thus far described is disclosed in greater detail in my copending joint application Serial No. 220,386, filed April 11, 1951, and is not per se a part of the present invention, since other suitable elutriator arrangements can be substituted if desired.

The conduit 10 is also provided with a third branch line 22 at a point in advance of valve 15 in line 11, through which line 22 a controlled portion of the catalyst is withdrawn from line 10 for supply to the mixing and heat exchange vessel generally indicated at 23. This vessel 23 is provided at or adjacent the top thereof with a fresh catalyst inlet line 24, through which line comparatively cool make-up catalyst is supplied for admixture with the hot catalyst introduced into the vessel through line 22. The inlet line 24 discharges into a larger concentric pipe 25 centrally located at the top of device 23 and extending downwardly for a suitable distance into this device, thereby forming an annulus 26 between the outer surface of pipe 25 and the surrounding wall of device 23. The hot catalyst from line 22 discharges into annulus 26 and passes downwardly as a compact annular layer adjacent the wall of device 23 surrounding a core of catalyst discharged from pipe 25. The amount of catalyst entering device 23 through lines 22 and 24 respectively will be directly proportional to the relative cross-sectional areas of line 24 and annulus 26 if solid bed gravitating flow is used; or if desired, other flow control devices for proportioning the respective flow rates of hot circulating catalyst and relatively cool make-up catalyst may be provided.

Extending inwardly from the wall of device 23 at spaced levels, are opposing pairs of downwardly inclined baffles 27, 28, 29, 30, the baffles of each pair being so spaced vertically as to provide therebetween a compact flowing catalyst layer, as indicated at 31. The several baffles are inclined at an acute angle to the vertical to effect continuous flow of the catalyst over the surface thereof. Each baffle, see Figures 2 and 3, is provided with struck-up portions 33 somewhat in the form of louvers, and providing horizontally extending slits 34 in the surface of the baffle, for reasons hereinafter appearing. While two pairs of such baffles are illustrated, it will be understood that a larger number may be used. Below the lowermost baffle 30 the vessel 23 tapers inwardly to form a frusto-conical hopper portion 36 communicating with a discharge conduit 37 arranged to discharge the catalyst within the bed thereof in the hopper 14 of the elutriating device.

As shown in Figure 1, the catalyst granules discharging into conduit 19 leave the lower portion of hopper 14 from a zone having in effect largely the form of an inverted cone with its axis coincident with the upward extension of the axis of conduit 19 and its peripheral boundaries being determined by the normal angle of flow of the granular particles as indicated by the dash lines 40 representing the boundaries of active flow of catalyst into the conduit 19. The conduit 37 from the mixing and heat exchange vessel 23, communicates with an extension 41 which can be slideably positioned at various levels within the flow cone as will be hereinafter explained.

The catalyst flowing through vessel 23 as a compact mass thereof in passing over the edge of each baffle member 27, 28, 29, 30 leaves a solids-free space 42 beneath each baffle member serving as a gas collecting and distributing chamber. Gas is admitted to the bottom of the bed in vessel 23 through a line 43 communicating with an open bottom hollow conical member 44, the gas passing upwardly around the base of the conical member through the bed of catalyst thereabove and into the chamber 42 formed below the lowermost baffle member 30. The gas then passes through the baffle member 30 by way of the slits 34 therein into the layer of catalyst between baffle members 29 and 30 and from the surface of that layer into the chamber 42 formed beneath baffle member 29. Because of the lower resistance to flow, it will be seen that most of the gas passes preferentially from chamber to chamber through the layer 31 and only a small portion through the deeper bed of catalyst thereabove. The gas leaves the gas collecting chamber beneath baffle 29 through the slits 34 therein and then passes upwardly through the bed, ultimately entering the chamber 42 formed beneath baffle member 28, leaving that chamber in a manner similar to that already described to pass through the layer of catalyst 31 between baffles 27 and 28. The gas flowing through the slits in baffle member 27 then passes upwardly through the bed thereabove and into pipe 25 ultimately being disengaged and discharged through an outlet 46 communicating with the solids free annular space at the juncture of conduit 24 with pipe 25. As an alternative, a portion or all of the gas may be disengaged in and discharged from the annular solids free space at the top of annulus 26. A gas line 47 is provided in branch line 22 to maintain the required pressure differential and to oppose flow of gas from vessel 23 into line 22.

It will be seen that in the arrangement of the baffle members within vessel 23, as described, there will be in addition to the heat exchange by direct contact of the hot and cold catalyst particles, efficient transfer of heat through the medium of the gas flowing through that vessel. The hot catalyst is substantially more concentrated adjacent the walls of vessel 23 while the cooler catalyst tends to remain adjacent the central axis of the vessel. In passing through a layer of catalyst 31, the gas initially contacts the relatively hot catalyst on the surface of the baffle member and gives up its acquired sensible heat to the cooler catalyst so that the whole of the catalyst discharged through conduit 37 reaches substantially the same equilibrium temperature.

The make-up catalyst thus heated in vessel 23 in admixture with that portion of the catalyst from line 10 supplied to vessel 23, discharges into the elutriator section 14 wherein it is further admixed with additional catalyst from line 10, the latter being at a somewhat higher temperature and serving to further raise the temperature of the catalyst entering hopper 14 through extension 41.

Adjustment of the position of extension 41 within the catalyst bed in hopper 14 is readily effected by providing between conduit 37 and extension 41 a removable flanged nipple 50. Extension 41 enters hopper 14 through an upwardly extending projection 51 provided with a suitable packing gland indicated at 52. By urging extension 41 into or out of the hopper 14, after loosening the packing gland 52, flange nipples 50 of various lengths may be coupled between conduit 37 and extension 41 to fix the position at which the outlet 53 of extension 41 discharges into the active cone of flow of catalyst within hopper 14. The ratio of catalyst from line 37 to the total catalyst entering discharge conduit 19 is thus adjustably determined by the cross-sectional area of the discharge outlet of conduit 41 as compared to the total area of the active flow cone at the level of outlet 53.

In the illustrated embodiment of Figure 1 by-pass line 12 is included for the purpose of maintaining a bed of catalyst in hopper 14 at a constant level. By this arrangement greater flexibility of operation is provided and controllable small amounts of makeup catalyst can be added to the system. For example, if flow control device 21 is set to pass catalyst at the rate of say 10 tons per hour and the flow control device 15 in elutriator feed line 11 is set to pass catalyst at the rate of say 4 tons per hour, the remaining 6 tons per hour will be supplied by line 12 and extension 41 in a controlled proportion determined by the position of outlet 53 in the bed. If the position of extension 41 is such as to feed catalyst at 1 ton per hour, line 12 will be caused to supply the remaining 5 tons per hour. If the ratio of the area of pipe 25 to annulus 26 is such as to feed equal amounts of catalyst to receptacle 23, the make-up catalyst will be supplied under the described conditions at the rate of one-half ton per hour. Smaller or greater amounts of catalyst, respectively, may be fed through extension 41 by regulating its position as described above, toward the periphery or toward the center of the active cone of flow of the catalyst in hopper 14. If, for some reason, an amount of make-up catalyst greater than that normally obtained by the above method is desired in a particular temporary period, such greater amount may be obtained at some relative sacrifice of temperature adjustment in vessel 23 by reducing or stopping the flow of hot catalyst through line 22.

In the embodiment illustrated in Figure 5 a seal leg operates as the fresh catalyst preheater permitting admission of such catalyst to a region of higher pressure without loss of pressure at the zone of such admission. The preheater is in the form of a long tubular conduit indicated generally at 60, which is provided at the top thereof with an enlarged section 61. Extending into the enlarged section 61 is a supply conduit 62 of approximately the same diameter as the main portion of conduit 60, the conduit 62 being supported and spaced from the wall of the enlarged section by a plurality of vertical spacers or plates 63.

Conduit 62 terminates within the enlarged section 61 and is divided into two substantially equal half sections by a vertical plate 64, extending downwardly below the bottom of conduit 62 and for some distance in conduit 60 below the enlarged upper portion thereof. The upper part of conduit 62 is formed by branches 65 and 66 respectively on opposite sides of plate 64.

The lower end of conduit 60 communicates with a catalyst supply conduit 67 through which catalyst from conduit 60 is supplied to any desired location in the catalytic processing unit. Conduit 67 is provided with a flared upper portion fitting over the end of conduit 60 and forming therewith an annulus 68 surrounding the lower end of conduit 60. A gas supply inlet 69 communicates with annulus 68.

Spaced along the longitudinal extent of conduit 60 and at alternate diametrically opposite sides thereof, there are provided lateral semi-circular chambers, each surrounding and enclosing a pair of spaced slots cut out of conduit 60. Thus each pair of slots 70 and 71 in conduit 60 is in communication with a chamber 72 formed by a semi-cylindrical curved outer wall spaced from the outer wall of conduit 60 and side walls 74 and 75 extending inwardly from wall 73 to conduit 60 and closing off this space at the opposite ends of the curve of wall 73. The top of each chamber 72 is a short distance above the upper slot 71 of the pair and is provided with a top or closure plate 76 extending horizontally from the top edge of wall 73 to the wall of conduit 60 and curved to conform to the space between wall 73 and conduit 60. Adjacent each lower slot 70 in conduit 60, the chamber 72 is provided with an inwardly and downwardly directed bottom closure 77 extending from the lower edge of semi-cylindrical wall 73 to the lateral surface of conduit 60 at a point just below the bottom of lower slot 70.

Extending for a short distance below the top 76 of each chamber is a curved plate 78 parallel to wall 73 and located between that wall and the adjacent lateral surface of conduit 60; the diametrically opposite edges of plate 78 extend to the side walls 74 and 75. The plate has spaced openings therein as indicated at 79. An inclined imperforate plate 81 extending upwardly and outwardly from approximately the lower edge of slot 71 to the lower edge of plate 78 provides together with the latter plate a generally vertical partition in the chamber.

In the operation of the embodiment illustrated in Figures 5 to 7, hot catalyst from branch 65, which may carry freshly regenerated catalyst from the elutriator supply line, enters conduit 60 on one side of partition plate 64. Fresh make-up catalyst in relatively cool condition is supplied to conduit 60 by branch 66 at the opposite side of the partitioning plate. The catalyst so supplied passes downwardly into and through conduit 60 as a compact flowing column composed of adjacent contacting vertical strata, the hot catalyst remaining largely along the side of conduit 60 adjacent that of its admission (left in Figure 5) and the fresh make-up catalyst remaining largely on the side of its admission (right in Figure 5). The gas admitted through inlet 69 (which may be air, flue gas, or any inert or compatible gas) passes upwardly through the lower part of conduit 60 in contact with the descending catalyst, but as a result of a route of less resistance being offered through the lowermost chamber 72a, the gas preferentially flows towards that chamber, entering through slot 70. The gas then passes through the chamber along the outside of conduit 60 and is returned to the interior of that conduit through the perforations 79 in partition plate 78 and upper slot 71.

The gas leaving lower chamber 72a and passing upwardly through conduit 60 thereabove tends to flow preferentially toward the next adjacent chamber 72 above. Since that chamber is located on the opposite side of conduit 60, there is created a cross flow of gas in the conduit. The gas passing upwardly through the chamber 60, accordingly, thus is caused to flow through the vertical stratum composed of hot catalyst picking up sensible heat therefrom, and then through the adjacent stratum of relatively cooler catalyst to which the gas gives up its contained heat. The gas enters the upper chamber 72 through the slot 70 therein and leaves that chamber through slot 71 to continue on its course through the column and is ultimately discharged at the open top of the enlarged section 61.

While only two opposing gas-passing chambers 72 and 72a are illustrated in the drawings, it will be seen that a larger number of these may be employed, if desired. The advantage of the construction in the illustrated embodiment of Figures 5–7 lies largely in the fact that the make-up catalyst can be supplied to a point of higher pressure without necessitating additional sealing requirements, since the conduit 60 in itself operates as a seal leg. This conduit may be substituted for all or a portion of a seal leg conduit already present in an existing system.

Catalyst flow through conduit 60 is of the solid bed or columnar type and the rate of such flow is suitably controlled by flow control device 82 in line 67. Device 82 may be a fixed or adjustable orifice plate or other valve-type member. In order that conduit 60 may operate properly as a seal leg such as in transferring catalyst from an upper region at a relatively low pressure to a lower region at a relatively high pressure the pressure of the gas introduced through line 69 is equal to or higher than the pressure of the lower region. However, it is to be understood that the gas introduced through line 69 does not interfere with the flow of solids in conduit 60.

Obviously many modifications and variations of the invention as hereinbefore set forth may be made without departing from the spirit and scope thereof, and therefore only such limitations should be imposed as are indicated in the appended claims.

I claim as my invention:

1. In a process wherein a body of granular catalyst is continuously circulated at relatively high temperature through a system comprising a catalyst regeneration zone, and wherein fresh relatively cool catalyst is gradually added to said body as make up for small quantities of catalyst removed therefrom, the steps which comprise: withdrawing a minor portion of hot regenerated catalyst from said circulating body; introducing said portion of regenerated catalyst into the upper region of a confined vertically elongated heat exchange zone; introducing said fresh catalyst into said upper region; passing said regenerated catalyst and said fresh catalyst downwardly within said upper region as separate compact moving streams merging therebelow to form a single compact moving column composed of adjacent contacting vertical strata of hot regenerated catalyst and relatively cool fresh catalyst, whereby the rate of flow of said streams of catalyst onto said column is directly proportional to their respective flow areas; passing said column of catalyst downwardly through the remaining portion of said heat exchange zone; introducing a gaseous heat exchange medium at the lower end of said zone for generally countercurrent flow through said column; disengaging the major portion of said gas from said column at each of a plurality of spaced intermediate levels therealong and at alternate opposite sides thereof, and directly reintroducing each disengaged portion of gas at a higher level along the same side of said column but below the next-succeeding disengaging level, whereby such reintroduced gas is caused to flow laterally through said column between such reintroduction and disengagement levels; discharging said gas at the upper end of said zone; discharging the admixture of regenerated and fresh catalyst at the bottom of said heat exchange zone; and passing said admixture of catalyst to said circulating body of solids.

2. The method according to claim 1, wherein said compact column while descending through said heat exchange zone is caused to flow laterally back and forth toward opposite sides thereof as a relatively-shallow layer, through which layer said gas ascends while passing between said gas reintroduction and disengaging levels.

3. The method according to claim 1 wherein during at least a part of the flow of solids through said zone said column comprises an outer layer of said hot granular catalyst surrounding and contacting an inner core of said fresh relatively-cool granular catalyst, and said gas in passing to discharge is caused to flow through said core.

4. The method according to claim 1 wherein said hot granular catalyst and said fresh relatively-cool granular catalyst are supplied to the top of said heat exchange zone at opposite sides thereof to form vertical contacting strata in said column, and said gas in flowing laterally across said zone between at least one pair of successive reintroduction and disengagement levels passes in general from a stratum consisting largely of hot solids to a stratum consisting largely of cooler solids.

5. In a fluid-solids contacting system wherein hot granular catalyst circulates successively through reaction and regeneration chambers under conditions requiring periodic removal of a portion of said catalyst and replacement thereof with relatively cool fresh make-up catalyst, apparatus for preheating and introducing said make-up catalyst which comprises: an upright elongated vessel; vertical partitioning means dividing the upper end portion of said vessel into laterally adjacent confined passageways having a common level of discharge; means for introducing hot regenerated catalyst to one of said passageways; means for introducing relatively cool fresh catalyst to the other of said passageways; catalyst discharge means at the bottom of said vessel adapted to maintain the catalyst therein as a continuous compact moving column of admixed fresh and regenerated catalyst directly receiving at its upper end separate compact moving streams of fresh and of regenerated catalyst from said passageways, whereby the proportion of fresh catalyst to make-up catalyst in said column is determined by the relative flow areas of said passageways at their common level of discharge and whereby said fresh and said regenerated catalyst in said column comprise adjacent contacting vertical strata; gas introducing means at the bottom of said vessel; gas disengaging means at a plurality of vertically spaced intermediate levels along and at alternate opposite sides of said vessel; gas reintroducing means whereby said gas flows laterally across said column in passing from a reintroduction level to the intermediate disengagement level next above; and means for discharging said gas at the top of said vessel.

6. Apparatus according to claim 5 wherein said hot catalyst stream is by-passed from the principal circulating body of catalyst in said system and is returned thereto accompanied by said make-up catalyst upon discharge from said heat exchange device.

7. Apparatus according to claim 5 wherein said gas disengaging and said gas reintroduction means comprises a series of baffles sloping downwardly and inwardly from the sides of said vessel, said baffles being vertically spaced at alternate opposite sides of said vessel and having openings adapted to pass said gas from the space immediately beneath each baffle into the layer of deflected catalyst flowing thereover.

8. Apparatus according to claim 5 wherein said partitioning means comprises an internal tubular member extending axially downward from the upper end of said vessel to a level above the uppermost of said baffles, the walls of said vessel and said tubular member being spaced so that said passageways comprise a central tubular passage and a surrounding annular passage, and separate conduit means for introducing said fresh make-up catalyst at the upper end of said tubular member and said hot catalyst at the upper end of said annular passage.

9. Apparatus according to claim 8 wherein said means for discharging gas at the top of said vessel is located at the upper end of said tubular member.

10. Apparatus according to claim 5, wherein said vertical partitioning means comprises a plate longitudinally dividing the upper end portion of said vessel and wherein the disengagement and reintroduction of said gas is effected through pairs of circumferential slots formed in the opposite sides of said vessel at vertically spaced locations therealong; and including means secured to the outer wall of said vessel adapted to provide an individual external plenum chamber for each of said pairs of slots, each pair of slots and its associated plenum chamber being such that gas flowing upwardly through said column of catalyst is preferentially disengaged therefrom at the lowermost slot, passes upwardly through said plenum, and is reintroduced into said column at the uppermost slot.

References Cited in the file of this patent

UNITED STATES PATENTS

| | | |
|---|---|---|
| 2,432,822 | Secor | Dec. 16, 1947 |
| 2,434,843 | Fahnestock et al. | Jan. 20, 1948 |
| 2,444,128 | Anderson | June 29, 1948 |
| 2,459,425 | Hemminger | Jan. 18, 1949 |
| 2,466,005 | Crowley | Apr. 5, 1949 |
| 2,656,306 | Bergstrom et al. | Oct. 20, 1953 |